United States Patent
Verbe et al.

(10) Patent No.: US 12,352,650 B2
(45) Date of Patent: *Jul. 8, 2025

(54) DEVICE EQUIPPED WITH AN OPTICAL SENSING ELEMENT FOR SENSING AXIAL LOADS, NOTABLY FOR A BEARING

(71) Applicant: Aktiebolaget SKF, Gothenburg (SE)

(72) Inventors: Olivier Verbe, Tours (FR); Yves-André Liverato, Saint Paterne Racan (FR)

(73) Assignee: Aktiebolaget SKF, Gothenburg (SE)

( * ) Notice: Subject to any disclaimer, the term of this patent is extended or adjusted under 35 U.S.C. 154(b) by 302 days.

This patent is subject to a terminal disclaimer.

(21) Appl. No.: 18/072,474

(22) Filed: Nov. 30, 2022

(65) Prior Publication Data

US 2023/0175904 A1  Jun. 8, 2023

(30) Foreign Application Priority Data

Dec. 7, 2021 (DE) .......................... 102021213869.1

(51) Int. Cl.
  *G01M 13/04* (2019.01)
  *G01L 5/166* (2020.01)

(52) U.S. Cl.
  CPC ............. *G01L 5/166* (2013.01); *G01M 13/04* (2013.01)

(58) Field of Classification Search
  CPC ................................ G01L 5/166; G01M 13/04
  See application file for complete search history.

(56) References Cited

U.S. PATENT DOCUMENTS

| | | | | |
|---|---|---|---|---|
| 4,833,871 | A * | 5/1989 | Ogawa ................. | G02B 6/4489 57/6 |
| 11,656,150 | B2 * | 5/2023 | Liverato .................. | G02B 6/12 73/593 |
| 2015/0323013 | A1 * | 11/2015 | Herdier ................. | G01M 13/04 384/448 |
| 2020/0333373 | A1 * | 10/2020 | Liverato ............ | H01R 13/6683 |
| 2021/0003478 | A1 * | 1/2021 | Liverato .................. | F16C 33/60 |
| 2021/0088393 | A1 * | 3/2021 | Båstedt et al. ........ | G01L 5/0009 |
| 2021/0123474 | A1 * | 4/2021 | Landrieve ............... | F16C 19/52 |
| 2022/0010840 | A1 * | 1/2022 | Liverato ................ | F16C 43/04 |
| 2022/0113204 | A1 * | 4/2022 | Hayes ....................... | G01L 1/26 |
| 2023/0296476 | A1 * | 9/2023 | Leblanc .................. | G01L 25/00 73/1.15 |
| 2023/0330741 | A1 * | 10/2023 | Yi ............................ | B22D 2/00 |
| 2023/0417612 | A1 * | 12/2023 | Leblanc ................ | G01M 13/04 |
| 2024/0175769 | A1 * | 5/2024 | Breuker .................. | G01L 1/242 |

* cited by examiner

*Primary Examiner* — Eric S. McCall
(74) *Attorney, Agent, or Firm* — GARCIA-ZAMOR INTELLECTUAL PROPERTY LAW, LLC; Ruy Garcia-Zamor

(57) ABSTRACT

A device configured to be mounted on a mechanical component and to measure an axial load exerted on the mechanical component, the device including a ring provided with an inner cylindrical surface and with an outer opposite cylindrical surface, the inner and outer cylindrical surfaces delimiting the radial thickness of the ring. The device further provides at least one optical sensing fiber disposed in a first circumferential groove provided on one of the outer and inner cylindrical surfaces of the ring.

20 Claims, 2 Drawing Sheets

DEVICE EQUIPPED WITH AN OPTICAL SENSING ELEMENT FOR SENSING AXIAL LOADS, NOTABLY FOR A BEARING

CROSS-REFERENCE TO RELATED APPLICATIONS

This application claims priority to German Patent Application no. 102021213869.1, filed Dec. 7, 2021, the contents of which is fully incorporated herein by reference.

TECHNICAL FIELD OF INVENTION

The present invention relates to the filed of condition monitoring of mechanical components for control processing by actively sensing loads, notably axial loads. More particularly, the invention relates to a device equipped with an optical sensing element, such as an optical fiber. More particularly, the invention relates to rolling bearings equipped with such a device.

BACKGROUND OF THE INVENTION

An optical fiber generally comprises a plurality of fiber Bragg gratings, called FBG, for sensing locations evenly spread around the circumference of a ring, for example for sensing at least one location additional to the rolling elements.

Fiber optical sensing can be used in monitoring pumps, compressors and other rotary machines, but also oil and gas, mines, marine, paper making (pulp & paper), aerospace etc . . . , and any installations where long-distance signals are needed.

In order to measure axial loads between two mechanical components, it is known to accommodate an optical fiber directly on an outer circumferential surface of one of the components.

However, since the mechanical components are usually made in hard heat-treated material, machining a groove directly on the surface of one of the mechanical components increases machining cost and limits the measurement surface.

There is a need to reduce manufacturing costs.

The aim of the present invention is consequently to provide a device configured to measure a single axial strain, independent from the mechanical components.

SUMMARY OF THE INVENTION

It is a particular object of the present invention to provide a device configured to be mounted on a mechanical component and to measure an axial load exerted on the mechanical component. The device comprises a ring or washer axially provided with an inner cylindrical surface and an outer opposite cylindrical surface, the inner and outer cylindrical surfaces delimiting the radial thickness of the ring.

The device further comprises at least one optical sensing fiber disposed in a first circumferential groove provided on one of the outer and inner cylindrical surfaces of the ring.

Machining the groove on the surface of a ring that does not need to be made in hard heat-treated material reduces machining cost.

Furthermore, in case of damage, the optical sensing fiber can be easily changed by removing the device, without removing the mechanical components.

For example, the ring extends axially extending along an axis.

For example, the ring has a general annular ring-shape

Advantageously, the first circumferential groove of the ring is located in a middle plane of symmetry of the ring.

For example, the ring comprises at least a second circumferential groove provided on the one of the outer and inner cylindrical surfaces and parallel to the first circumferential groove along the axis.

Such second circumferential groove reduces the total weight of the device.

In an embodiment, the other of the inner and outer surfaces of the ring comprises a central circumferential groove parallel to the first groove along a direction perpendicular to the axis.

In other words, the central circumferential groove of the ring is radially surrounded by the first groove of the ring, or the first groove is radially surrounded by the central circumferential groove. Such central circumferential groove magnifies the circumferential strain when the axial force is applied.

For example, the axial length of the central groove of the ring may be bigger than the axial length of the first groove of the ring.

Alternatively, the other surface of the ring may be deprived of the central circumferential groove.

Advantageously, the ring is further provided with two opposite frontal faces which delimit the axial thickness of the ring, and wherein at least one of the frontal faces comprises a radial surface and an inclined surface connected to other of the inner and outer cylindrical surfaces of the ring.

The inclined surface of the ring may be made by removing material from the frontal face. Such material removal increases the sensitivity of the optical fiber to measure the axial loads.

In an embodiment, both frontal faces of the ring comprise a radial surface and an inclined surface connected to the other of the inner and outer cylindrical surfaces of the ring.

For example, the first groove is provided on the outer cylindrical surface of the ring and the central groove is provided on the inner cylindrical surface of the ring.

However, in an alternative, the first groove could be provided on the inner cylindrical surface of the ring and the central groove could be provided on the outer cylindrical surface of the ring.

The optical fiber may comprise a plurality of fiber Bragg gratings, called FBG, for sensing locations evenly spread around the circumference of the first ring of the bearing. For example, the fiber Bragg gratings are used to measure local strain in the circumferential groove.

For example, the optical fiber comprises three or more of fiber Bragg gratings for sensing locations evenly spread around the circumference of the mechanical component.

The use of at least three FBGs enables the optical fiber to detect not centered axial load and thus to improve the measurement accuracy.

According to another aspect, the invention concerns a bearing assembly provided with a bearing comprising a first ring and a second ring capable of rotating concentrically relative to one another and with a device as described above mounted axially against a frontal face of the first ring.

The bearing may be for example a rolling bearing comprising at least one row of rolling elements, such as balls and/or rollers, arranged between raceways provided on the first and the second rings.

Alternatively, the bearing may be a plain bearing without rolling elements.

In one embodiment, the first ring of the bearing is the outer ring whereas the second ring is the inner ring. As an alternative, it could be possible to provide a reversed arrangement with the first ring forming the inner ring and the second ring forming the outer ring.

According to another aspect, the invention also relates to a machine comprising a rotating shaft, a housing and a bearing assembly as previously mentioned, the bearing being radially interposed between the housing and the shaft. The device is axially located between the frontal face of the first ring and a shoulder of the housing. Alternatively, the device is axially located between the frontal face of the first ring and a shoulder of the shaft.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of specific embodiments given by way of non-limiting examples and illustrated by the appended drawings on which.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5) degrees, forty-five (45°) degrees, fifty-two (52°) degrees, or the like and thus provides support for claiming a preferred embodiment with the element moving along the arcuate path thirty-three-point five (33.5°) degrees. The expressions "outer" and "inner" refer to the rotational axis X-X of the rotating part of the device, the inner parts being closer to the axis than the outer parts.

Figure 1:
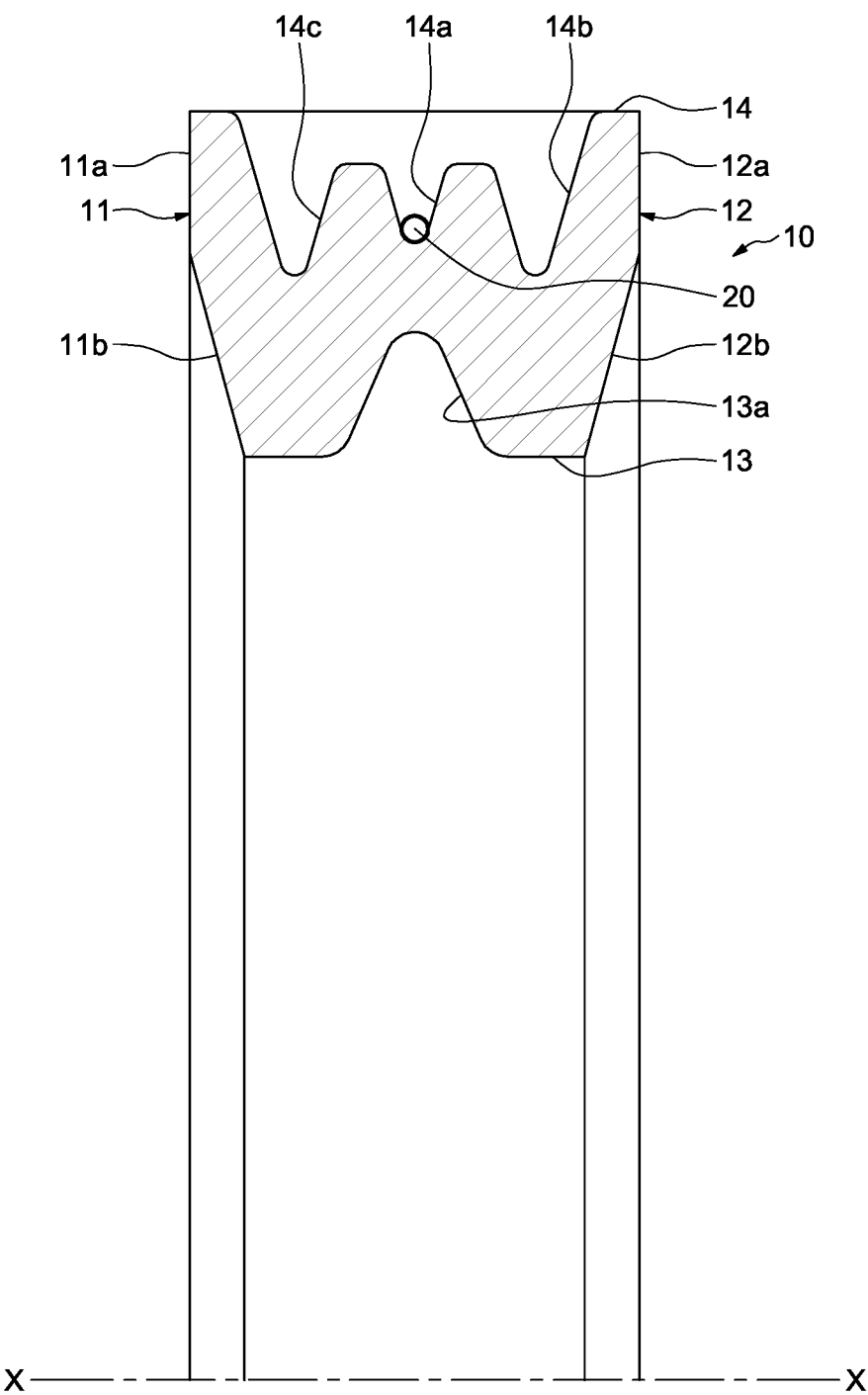
FIG. 1 is a schematic cross-section view of a device according to an embodiment of the invention.

Referring to FIG. 1, which illustrates an embodiment of a device configured to measure a single axial strain.

The device comprises a ring 10 or washer having a general annular ring-shape and delimited axially by two frontal faces 11, 12 and radially by an inner cylindrical surface 13 and an outer cylindrical surface 14. The faces 11, 12 delimit the axial thickness of the ring 10. The inner and outer surfaces 13, 14 delimit the radial thickness of the ring 10.

As illustrated on FIG. 1, the outer cylindrical surface 14 of the ring 10 comprises three parallel circumferential outer grooves 14a, 14b, 14c along the axis X-X. The outer grooves 14a, 14b, 14c are regularly spaced from each other along the axis X-X.

Alternatively, the outer cylindrical surface 14 of the ring 10 could comprise a single outer circumferential groove 14a.

The device further comprises an optical strain gauge, typically an optical sensing fiber 20 mounted in one of the outer circumferential grooves of the ring 10, here the central groove 14a. As illustrated, the optical sensing fiber 20 is mounted at the bottom of the central groove 14a. The optical sensing fiber 20 is radially offset inwards with respect to the outer cylindrical surface 14.

The central groove 14a is located in a middle plane of symmetry (not shown) of the ring 10.

The optical fiber 20 may comprise a plurality of fiber Bragg gratings, called FBG, for sensing locations evenly spread around the circumference of one of the mechanical components.

Advantageously, the optical fiber 20 comprises at least three FBGs to detect not centered axial load and thus to improve the measurement accuracy.

The optical fiber 20 comprises a sensing part (not shown) located at an end of the optical fiber 20. An optical signal of the sensing fiber is further analyzed by an optical interrogator (not shown).

In the illustrated example, the inner surface 13 of the ring 10 comprises an inner central circumferential groove 13a parallel to the outer central groove 14a along a direction perpendicular to the axis X-X. In other words, the inner central circumferential groove 13a of the ring 10 is radially surrounded by the outer central groove 14a. Such inner central circumferential groove 13a magnifies the circumferential strain when the axial force is applied.

The inner groove 13a is located in a middle plane of symmetry (not shown) of the ring 10.

The axial length L1 of the inner circumferential groove 13a is bigger than the axial length L2 of the first outer groove 14a.

The axial lengths are measured along the axis X-X.

As illustrated, the frontal faces 11, 12 of the ring 10 both comprise a radial surface 11a, 12a and an inclined surface 11b, 12b connected to the inner surface 13.

The inclined surface 11b, 12b may be made by removing material from both frontal surfaces 11, 12. Such material removal increases the sensitivity of the optical fiber 20 to measure the axial loads.

As an alternative, only one of the frontal faces 11, 12 may be provided with such material removal.

As an alternative, the ring 10 may be made by molding plastic material. The inclined surface 11b, 12b made on one or both frontal faces 11, 12 may thus be made when molding the ring.

Figure 2:
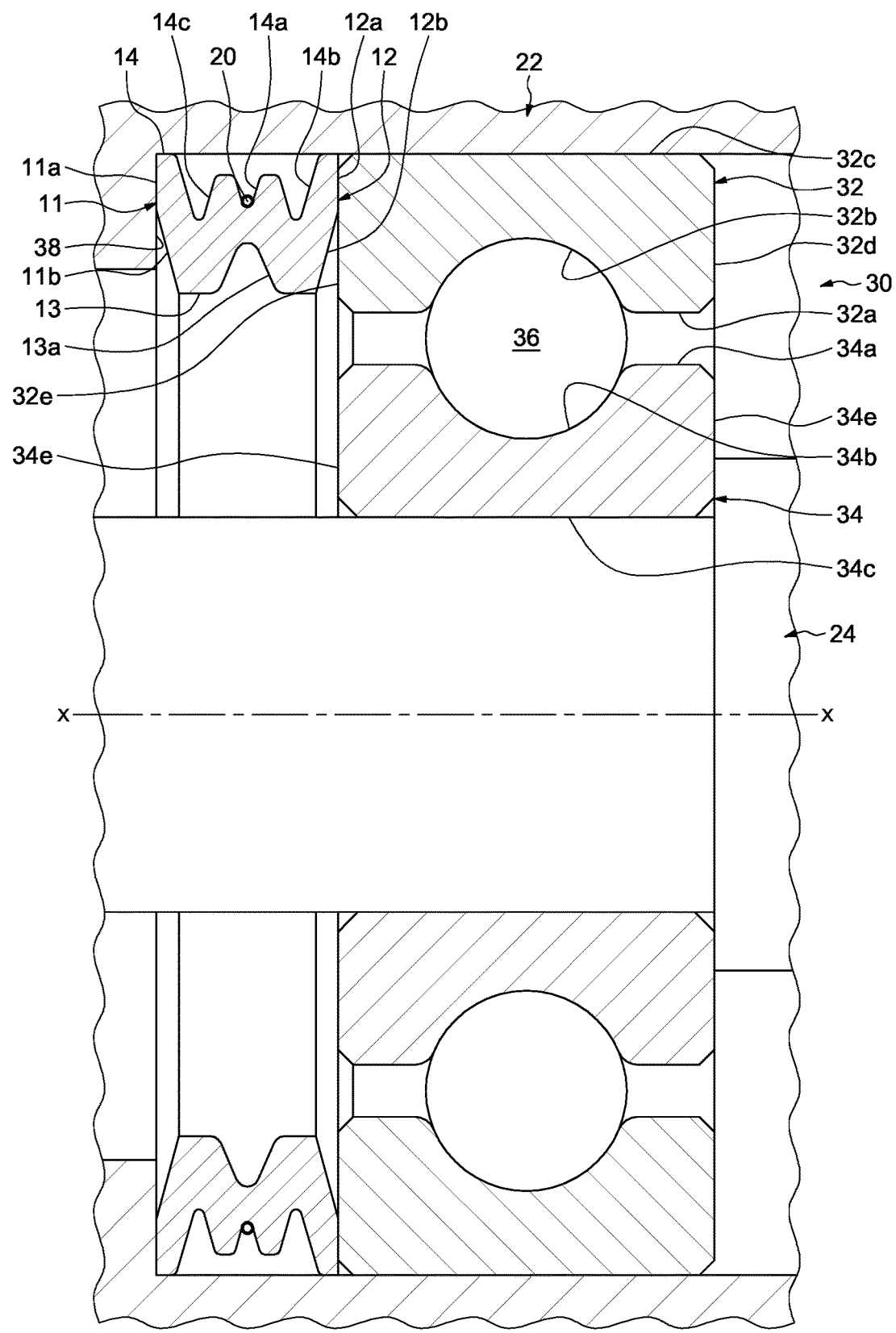
FIG. 2 is a schematic cross-section view of a machine provided with a rolling bearing and with the device of FIG. 1 implemented on the rolling bearing.

The embodiment of FIG. 2, in which the same elements bear the same reference, illustrate schematically and partially a machine comprising a fixed housing 22, a rotating shaft 24 extending along the axis X-X supported by a bearing 30. The bearing 30 is radially interposed between the housing 22 and the rotating shaft 24.

The bearing 30 comprises an outer ring 32 as a first ring and a rotating inner ring 34 as a second ring capable of rotating concentrically relative to one another.

The bearing 30 here further comprises a row of rolling elements 36, such as balls, arranged therebetween, and a cage (not shown).

The bearing 30 is here of the ball bearing type. However, the invention is not limited to ball bearing and may be applied to taper roller bearing, spherical roller thrust bearing, four-point angular contact ball bearing, thrust ball bearing, plain bearing and to any other bearings taking combined axial and radial loads.

As illustrated, the outer ring 32 of the bearing 30 has, on its inner cylindrical surface 32a, a toroidal groove 32b which forms a raceway for the rolling elements 36.

The outer ring 32 further comprises an outer cylindrical surface 32c, radially opposite to the inner cylindrical surface 32a. The outer surface 32c of the outer ring is in radial contact with the bore of the housing.

The outer ring 12 of the bearing 30 also comprises two radial frontal faces 32d, 32e which axially delimits the inner cylindrical surface 32a and the outer cylindrical surface 32c. The frontal faces 32d, 32e delimit the axial thickness of the outer ring.

The inner ring 34 of the bearing 30 has on its outer cylindrical surface 34a a toroidal groove 34b which forms a raceway for the rolling elements 36.

The inner ring 34 further comprises an inner cylindrical surface 34c, radially opposite to the outer cylindrical surface 34a and mounted on the shaft 24. The inner ring 34 also comprises two radial frontal faces 34d, 34e which axially delimits the inner cylindrical surface 34c and the outer cylindrical surface 34a. The frontal faces 34d, 34e delimit the axial thickness of the inner ring.

In order to monitor the axial loads exerted on the bearing 30, the bearing 30 is equipped with the device of FIG. 1. The bearing 30 and the device form a bearing assembly.

As illustrated, the ring 10 of the device is axially located between the frontal face 32e of the outer ring of the bearing and a radial shoulder 38 of the housing. The ring 10 is axially interposed between the frontal face 32e of the outer ring and the radial shoulder 38 of the housing. The frontal face 11 of the ring axially abuts against the radial shoulder 38 of the housing whereas the frontal face 12 axially abuts against the frontal face 32e of the outer ring. The outer surface 14 of the ring radially comes into contact with the bore of the housing 22. The optical sensing fiber 20 remains radially spaced apart from the bore of the housing 22. In the illustrated example, the inner surface 13 of the ring is radially offset outwards with respect to the bore 32a of the outer ring of the bearing.

A previously mentioned, the ring 10 is here axially located between the outer ring of the bearing and a radial shoulder 38 of the housing. Alternatively, the ring 10 may be axially located between the inner ring of the bearing and a radial shoulder of the shaft.

In a general way, the device may be used to measure axial loads for any mechanical components.

Thanks to the invention, it is possible to measure a single axial strain, independent from the mechanical components while reducing manufacturing costs.

The invention claimed is:

1. A combination of a bearing and a device ring configured to be mounted on the bearing to measure an axial load exerted on the bearing, the combination comprising:
   the bearing having an outer bearing ring and an inner bearing ring;
   a plurality of rolling elements are located between the outer bearing ring and the inner bearing ring such that the outer bearing ring and the inner bearing ring rotate relative to each other;
   the outer bearing ring having an inner cylindrical surface and with an outer cylindrical surface, the inner cylindrical surface and the and outer cylindrical surface delimiting a radial thickness of the outer bearing ring, when viewed in axial cross section, an axial end of the outer bearing ring is formed by a radial frontal ring surface;
   a device ring having an outer cylindrical device surface and, when viewed in axial cross-section, having a device axial end formed by a radial device surface, the outer cylindrical device surface having a circumferential groove therein;
   an optical fiber extending circumferentially around the device ring and located within the circumferential groove; and
   the device ring being positioned adjacent to the bearing such that the radial device surface contacts the radial frontal ring surface.

2. The combination of claim 1, wherein the circumferential groove of the device ring is located in a middle plane of symmetry of the device ring, wherein the outer bearing ring and the inner bearing ring have a same axial width when viewed in cross-section.

3. The combination of claim 1, wherein the optical fiber comprises three or more of fiber Bragg gratings for sensing locations evenly spread around the circumference of the mechanical component.

4. The combination of claim 1, wherein the device ring comprises a second circumferential groove provided on any one of the group of the outer cylindrical device surface or an inner cylindrical device surface, the second circumferential groove being parallel to the circumferential groove, wherein the outer bearing ring and the inner bearing ring have a same axial width when viewed in cross-section.

5. The combination of claim 4, wherein, when the device ring is viewed in axial cross section, the radial device surface is adjacent to and connected to an inclined device surface that is connected to the inner cylindrical device surface.

6. The combination of claim 4, wherein, when the device ring is viewed in cross section, the second circumferential groove is positioned in the inner cylindrical device surface and is located on the middle plane of symmetry of the device ring.

7. The combination of claim 6, wherein, when the device ring is viewed in axial cross section, a first axial length of a radial outermost portion of the circumferential groove is less than a second axial length of a radial innermost portion of the second circumferential groove.

8. A device ring configured for use with a bearing such that when attached axially to an outer bearing ring of the bearing the device ring can be used to measure an axial load exerted on the bearing, the outer ring having an inner cylindrical surface and with an outer cylindrical surface, the inner cylindrical surface and the and outer cylindrical surface delimiting a radial thickness of the outer bearing ring, when viewed in axial cross section, an axial end of the outer bearing ring is formed by a radial frontal ring surface, the device ring comprising:
- a device ring having an outer cylindrical device surface and, when viewed in axial cross-section, having a device axial end formed by a radial device surface, the outer cylindrical device surface having a circumferential groove therein, the device ring having an inner cylindrical device surface, the outer cylindrical device surface being configured to abut a portion of a housing element enclosing the device ring, the inner cylindrical device surface not being configured to abut roller elements;
- an optical fiber extending circumferentially around the device ring and located within the circumferential groove; and
- wherein the device ring is configured to be being positioned adjacent to the bearing such that the radial device surface contacts the radial frontal ring surface.

9. The device ring of claim 8, wherein the circumferential groove of the device ring is located in a middle plane of symmetry of the device ring.

10. The device ring of claim 9, when the device ring is viewed in cross section, the second circumferential groove is positioned in the inner cylindrical device surface and is located on the middle plane of symmetry of the device ring.

11. The device ring of claim 8, wherein the device ring comprises a second circumferential groove provided on any one of the group of the outer cylindrical device surface or the inner cylindrical device surface, the second circumferential groove being parallel to the circumferential groove.

12. The device ring of claim 11, wherein, when the device ring is viewed in axial cross section, a first axial length of a radial outermost portion of the circumferential groove is less than a second axial length of a radial innermost portion of the second circumferential groove.

13. The device ring of claim 11, wherein, when the device ring is viewed in axial cross section, the radial device surface is adjacent to and connected to an inclined device surface that is connected to the inner cylindrical device surface.

14. A system having a bearing and a device ring configured to be mounted on the bearing to measure an axial load exerted on the bearing, the system comprising:
- a shaft;
- the bearing mounted on the shaft and having an outer bearing ring and an inner bearing ring;
- a plurality of rolling elements are located between the outer bearing ring and the inner bearing ring such that the outer bearing ring and the inner bearing ring rotate relative to each other;
- the outer bearing ring having an inner cylindrical surface and with an outer cylindrical surface, the inner cylindrical surface and the and outer cylindrical surface delimiting a radial thickness of the outer bearing ring, when viewed in axial cross section, an axial end of the outer bearing ring is formed by a radial frontal ring surface;
- a device ring having an outer cylindrical device surface and, when viewed in axial cross-section, having a device axial end formed by a radial device surface, the outer cylindrical device surface having a circumferential groove therein;
- an optical fiber extending circumferentially around the device ring and located within the circumferential groove;
- the device ring being positioned adjacent to the bearing such that the radial device surface contacts the radial frontal ring surface; and
- a housing component comprising a housing shaft surface and a housing frontal surface, the shaft extending into the housing component with the outer cylindrical surface of the outer bearing ring and the outer cylindrical device surface of the device ring both contacting the housing shaft surface and a portion, the device ring being disposed between and contacting each of the outer bearing ring and the housing frontal surface.

15. The system of claim 14, wherein the circumferential groove of the device ring is located in a middle plane of symmetry of the device ring, wherein the outer bearing ring and the inner bearing ring have a same axial width when viewed in cross-section.

16. The system of claim 14, wherein, when the device ring is viewed in axial cross section, the radial device surface is adjacent to and connected to an inclined device surface that is connected to the inner cylindrical device surface.

17. The system of claim 14, wherein the optical fiber comprises three or more of fiber Bragg gratings for sensing locations evenly spread around the circumference of the mechanical component.

18. The system of claim 14, wherein the device ring comprises a second circumferential groove provided on any one of the group of the outer cylindrical device surface or an inner cylindrical device surface, the second circumferential groove being parallel to the circumferential groove, wherein the outer bearing ring and the inner bearing ring have a same axial width when viewed in cross-section.

19. The system of claim 18, wherein, when the device ring is viewed in cross section, the second circumferential groove is positioned in the inner cylindrical device surface and is located on the middle plane of symmetry of the device ring.

20. The system of claim 18, wherein, when the device ring is viewed in axial cross section, a first axial length of a radial outermost portion of the circumferential groove is less than a second axial length of a radial innermost portion of the second circumferential groove.

* * * * *